United States Patent [19]

Brady

[11] Patent Number: 4,700,910
[45] Date of Patent: Oct. 20, 1987

[54] STRUCTURE AND METHOD FOR MOUNTING AN AIRCRAFT WEIGHT SENSOR WITHIN TUBULAR AXLE OF AN AIRCRAFT UNDERCARRIAGE

[75] Inventor: Arthur R. Brady, Redmond, Wash.

[73] Assignee: Sundstrand Data Control, Inc., Rockford, Ill.

[21] Appl. No.: 689,950

[22] Filed: Jan. 9, 1985

[51] Int. Cl.$^4$ .............................................. B64D 47/00
[52] U.S. Cl. .................... 244/1 R; 177/136
[58] Field of Search ................ 244/1 R; 33/313, 350; 177/136; 73/65, 781; 277/105; 364/463

[56] References Cited

U.S. PATENT DOCUMENTS

| | | | |
|---|---|---|---|
| 1,925,268 | 9/1933 | Mellor | 277/105 |
| 3,203,234 | 8/1965 | Westcost, Jr. et al. | 73/65 |
| 3,227,464 | 1/1966 | Makin | 277/105 |
| 3,351,350 | 11/1967 | Shepler | 277/105 |
| 4,312,042 | 1/1982 | Bateman | 364/463 |
| 4,428,123 | 1/1984 | Hulsing, II et al. | 33/313 |
| 4,506,328 | 3/1985 | Bateman | 364/463 |
| 4,507,742 | 3/1985 | Bateman | 364/567 |

*Primary Examiner*—Galen Barefoot
*Assistant Examiner*—Lynn M. Fiorito
*Attorney, Agent, or Firm*—Wood, Dalton, Phillips, Mason & Rowe

[57] ABSTRACT

A mounting and mounting method for a sensor positioned within a tubular axle of an aircraft undercarriage which will provide an output voltage proportional to the angular deflection of an axle for computation of aircraft gross weight. The sensor is not affected by cross-sectional distortions of the tubular axle under loading, undersirable shear frictional effects at the interface between the sensor mounting and the tubular axle and differential angular deflections of the axle.

The cylindrical mounting member for the sensor has a pair of O-rings adjacent opposite ends thereof which are positioned to space the periphery of the mounting member from the bore of the tubular axle and which are under radial compression and act to provide uniform radial compressive forces applied about the full circumferential periphery of the cylindrical mounting member and absorb distortions of the axle by elastic deformation thereof. At least one of the O-rings is axially compressed for increased radial compression between the cylindrical mounting and the tubular axle to further improve the action in immunizing the sensor from distortion effects in the axle and maintain the sensor in the desired position endwise of the tubular axle.

In the method of mounting the sensor, the cylindrical mounting member which carries the sensor has a pair of O-rings associated therewith adjacent opposite ends thereof and this structure is inserted axially within the tubular axle. The O-rings are sized to achieve radial compression between the mounting member and the tubular axle and with one of the O-rings having additional axial force exerted thereagainst to increase the radial compression to improve the action of the O-rings and assure maintaining the location of the sensor axially of the tubular axle.

1 Claim, 3 Drawing Figures

U.S. Patent   Oct. 20, 1987   4,700,910
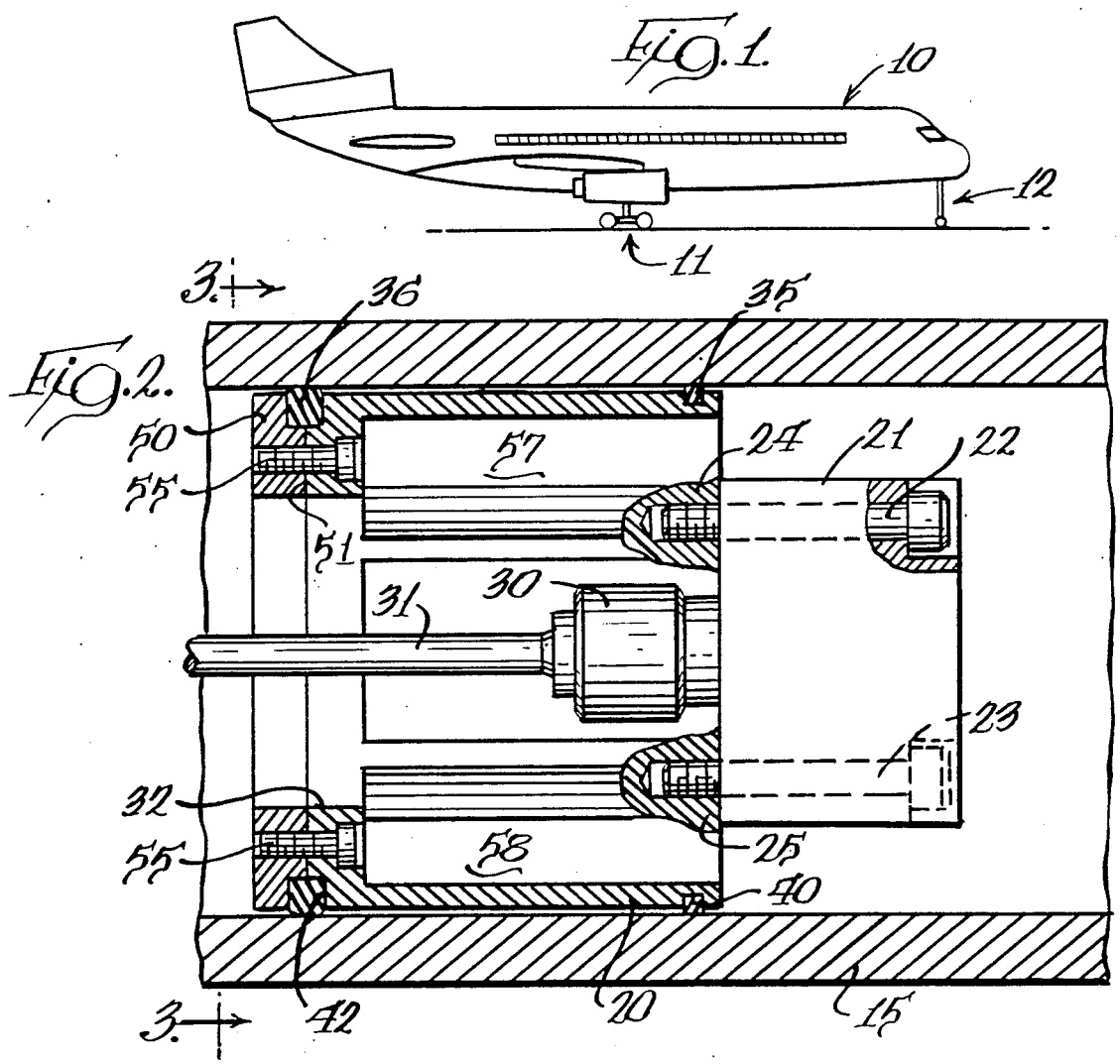
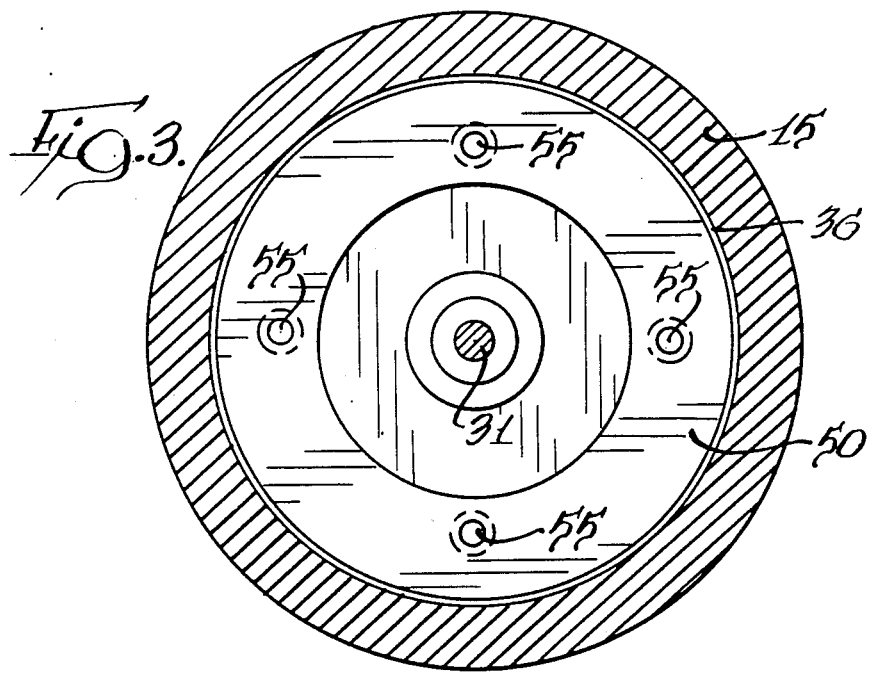

STRUCTURE AND METHOD FOR MOUNTING AN AIRCRAFT WEIGHT SENSOR WITHIN TUBULAR AXLE OF AN AIRCRAFT UNDERCARRIAGE

DESCRIPTION

1. Field of the Invention

This invention relates to a mounting method for a sensor, such as an inclinometer or accelerometer, used in a computing system for determining aircraft gross weight and the location of the center of gravity and a structure for obtaining such mounting. The sensor is isolated from cross-sectional distortions and differential angular deflections of the tubular axle resulting from the aircraft loads supported by the axle as well as shear friction effects.

2. Background of the Invention

In aircraft equipment systems designed to compute the gross weight of the aircraft and the location of the center of gravity, it is known to use sensors in the form of electronic inclinometers and/or accelerometers which are mounted within the undercarriage wheel axles. This type of sensor when positioned within a tubular axle of the undercarriage provides means whereby an output voltage proportional to the axle angular deflection is produced for computation of the aircraft gross weight. The angular deflection is directly dependent upon that portion of the aircraft gross weight supported by the tubular axle for the wheel. One form of such a computing system is disclosed in the Bateman U.S. Pat. No. 4,312,042, owned by the assignee of this application. A further refinement of such a system is disclosed in the Bateman U.S. application Ser. No. 403,438, filed July 30, 1982.

In the previous systems, the sensor has been carried by a cylindrical mounting member fitted within the bore of the tubular axle of the aircraft undercarriage. When the cylindrical mounting member is in proper position, it is radially clamped within the bore of the axle by means of a longitudinally-adjustable clamping wedge which brings the metal of the cylindrical mounting member into full contact with the metal tubular axle. This type of mounting has resulted in the introduction of undesirable shear frictional effects at the interface between the cylindrical mounting member and the tubular axle and, additionally, there are cross-sectional distortions of the tubular axle under loading which leads to variations in the force with which the cylindrical mounting member is held in position in the tubular axle. These cross-sectional distortions result in a general elliptical cross-sectional shaping of the tubular axle resulting from the reaction to a load on the axle. The lower 180° of the axle tends to compress and the upper half is placed in tension, with both halves assuming an elliptical shape. This is a stress resulting from bending, as occurs in bending a tube, with the inner side of the bend being a summation of compression stress forces and the curvature at the outer side of the bend being a summation of tensile stress forces.

The foregoing frictional effects and clamping force variations introduce errors into the angular deflection of the cylindrical mounting member relative to the angular deflections of the axle. There can also be differential angular deflections resulting from loading, with the axle tending to have more slope adjacent the ground-engaging wheel than adjacent the supporting strut for the axle. All of the foregoing can result in errors which would cause the output voltage of the sensor to indicate a false measure of the gross weight applied to the undercarriage axle.

An additional problem in connection with the existing mounting of a sensor results from the metal-to-metal contact between the cylindrical mounting member and the axle. Anti-corrosive protection coatings must be removed at the interface locations or means provided whereby the clamping means which mount the components together are caused to penetrate the wall of the axle. Such clamping requirements introduce the possibility of corrosive attack of the axle material and/or the introduction of stress concentration areas within the tubular axle and both conditions may lead to premature fatigue failues of the axle.

SUMMARY OF THE INVENTION

A primary feature of the invention is to provide a structure and method for mounting a sensor within a tubular axle of an aircraft undercarriage whereby the sensor will not introduce errors into the calculation of aircraft weight through a computing system.

More particularly, the invention relates to a mounting for a sensor in an aircraft system for computing aircraft gross weight and location of the center of gravity wherein the sensor is mounted within a tubular wheel axle of an aircraft undercarriage and is isolated from errors resulting from loading of the axle. The mounting includes a cylindrical mounting member for the sensor which has an outer diameter less than the bore of the tubular axle to provide a clearance therebetween. First and second elastomeric rings surround the cylindrical mounting member and are positioned one adjacent each end thereof with the elastomeric rings being under uniform radial compression around the periphery of the cylindrical mounting member to support the cylindrical mounting member spaced from the tubular axle and to absorb by elastic deformation the cross-sectional distortions and differential angular deflections of the tubular axle under load.

An object of the invention is to provide a new and improved mounting for a sensor in a tubular axle for a wheel of an aircraft undercarriage.

Still another object of the invention is to provide a new and improved method for mounting a sensor within the tubular axle of an aircraft undercarriage.

Still another object of the invention is to provide a mounting for an inclinometer or the like within a tubular axle of an aircraft in the form of a cylindrical mounting member mounted with a clearance within the bore of the tubular axle and with a pair of O-rings surrounding said cylindrical mounting member adjacent opposite ends thereof and under radial compression to isolate the mounting member from axle distortions resulting from load imposed thereon.

Still another object of the invention is to provide a mounting for an inclinometer or the like within a tubular axle of an aircraft undercarriage comprising, in combination, a tubular axle having an internal diameter, a cylindrical mounting member within the tubular axle and having an outer diameter less than the internal diameter of the tubular axle to provide a radial clearance therebetween, a first elastomeric ring surrounding said cylindrical mounting member adjacent an end thereof and extending beyond the surface thereof to provide radial compression between the cylindrical mounting member and the tubular axle resulting from endwise insertion of the cylindrical mounting member in the tubular axle, a rectangular annular peripheral groove adjacent the opposite end of the cylindrical mounting member, said groove being formed between an end face of the cylindrical mounting member and an annular clamping ring which abuts said end face, and a second elastomeric ring positioned in said groove and having a relaxed diameter greater than the width of said groove.

An additional object of the invention is to provide a method of mounting a sensor such as an inclinometer within an aircraft undercarriage tubular wheel axle comprising, mounting the sensor on a cylindrical mounting member having an outer diameter less than that of the tubular wheel axle, surrounding the cylindrical mounting member adjacent an end thereof with an elastomeric ring positioned in a groove and having an outer diameter greater than the internal diameter of the tubular wheel axle, positioning the cylindrical mounting member in the tubular wheel axle with a second elastomeric ring within a second groove adjacent the other end of the cylindrical mounting member, and compressing the second elastomeric ring after the cylindrical mounting member is positioned in the tubular wheel axle by force applied lengthwise of the cylindrical mounting member to apply a radial compressive force between the bore of the tubular wheel axle and the cylindrical mounting member to hold the cylindrical mounting member in position and enable the sensor to follow the axle deflection characteristic.

DESCRIPTION OF THE DRAWING

FIG. 1 is a side elevational view of an aircraft of the type having an undercarriage with wheel axle members in which the invention may be utilized;

FIG. 2 is a central vertical section through a portion of an undercarriage wheel axle member and showing the sensor mounting structure and illustrating the method of mounting the sensor; and FIG. 3 is a vertical transverse section taken generally along the line 3—3 in FIG. 2

DESCRIPTION OF THE PREFERRED EMBODIMENT

An aircraft of the type that can utilize equipment designed to compute aircraft gross weight and location of the center of gravity is shown in FIG. 1 at 10. As more particularly described in the Bateman U.S. Pat. No. 4,312,042, previously referred to, the aircraft undercarriage has tubular axles supporting ground-engaging wheels. The aircraft has a main landing gear, identified generally at 11, and nose landing gear, identified generally at 12. The aircraft weight is determined by measuring the weight on each of the main landing gear and on the nose gear and this measurement is accomplished by sensing the amount of deflection in the wheel-supporting tubular axles. This sensing is by means of a sensor in the form of an electronic inclinometer and/or accelerometer which provides an output voltage proportional to the axle angular deflection and the angular deflection is directly dependent upon that portion of the aircraft gross weight supported by the axle member.

Referring to FIGS. 2 and 3, the new and improved mounting and mounting method is illustrated, with a tubular axle of an aircraft undercarriage being identified at 15. A cylindrical mounting member 20 of metal is positioned within the tubular axle 15 and, at one end thereof, mounts a protective case 21 for a sensor disposed therein. The protective case is attached to an end of the cylindrical mounting member 20 by threaded members, two of which are shown at 22 and 23, and which thread into bosses 24 and 25 formed at one end of the cylindrical mounting member. An electrical cable and connector assembly including a connector 30 and a cable 31 extends from the protective case 21 and through a central opening 32 in the cylindrical mounting member for electrical connection with other components of the aircraft equipment system which computes aircraft gross weight.

The cylindrical mounting member 20 has an outer diameter less than the diameter of the bore of the tubular axle 15 to provide a clearance therebetween and the cylindrical mounting member has its external periphery spaced from the bore of the tubular axle by a pair of elastomeric rings 35 and 36 in the form of O-rings. The O-ring 35 is mounted within a rectangular annular peripheral groove 40 adjacent one end of the cylindrical mounting member 20. The O-ring 36 is mounted in a rectangular annular peripheral groove 42 adjacent the opposite end of the cylindrical mounting member 20.

An annular clamping ring 50 is associated with an end face 51 of the cylindrical mounting member 20. One-half of the rectangular annular peripheral groove 42 for the O-ring 36 is formed in the end face 51 of the cylindrical mounting member 20 and the other one-half in the annular clamping ring 50. The O-ring 36 is sized for insertion witout compression and is axially compressed by drawing the clamping ring 50 against the end face 51 by means of a plurality of screws 55 which are accessible through access openings within the cylindrical mounting member, with a pair of these openings being shown at 57 and 58 in FIG. 2.

The method of mounting the sensor includes the steps of mounting the sensor and protective case 21 to the cylindrical mounting member 20 and then placing the O-rings 35 and 36 in the receiving grooves therefor with the clamping ring being loosely held to the cylindrical mounting member. The O-ring 36 when relaxed has an outer diameter greater than the diameter of the axial bore. The cylindrical mounting member and the assembled O-rings are then inserted endwise into the bore of the tubular axle 15 to the desired location. The O-ring 35 is sized to be installed with a radial compression typical in common practice for installing an O-ring. The screws 55 are then tightened to exert axial pressure on the relaxed O-ring 36 to obtain radial expansion thereof and the radial compression between the axle 15 and the cylindrical mounting member 20 greater than if the O-ring had merely been installed in the conventional manner.

In one embodiment of the disclosed structure, the bore of the tubular axle 15 has a diameter of 3.346" and the outer diameter of the cylindrical mounting member 20 is 3.310". The annular groove 42 has an outer diameter of 2.846" and the O-ring 36 has a relaxed cross-sectional diameter of 0.250". The width of the rectangular annular peripheral groove 42 when the annular clamping ring 50 is tightly drawn against the end face 51 of the cylindrical mounting member is 0.220". With the O-ring 36 having a relaxed cross-sectional diameter of 0.250", the axial compression thereof into a groove of a width of 0.220" induces a radial compressive force between the axle bore and the cylindrical mounting member 20.

The radial clearance between the cylindrical mounting member 20 and the axle bore is maintained sufficient by the O-rings to insure that there is no metallic contact between the mounting member and the axle 15 during load deflection of the axle. The cylindrical mounting member 20 is retained and suspended within the axle bore by a uniformly distributed radial force applied about the periphery adjacent the opposite ends thereof. These forces also maintain the axial location of the cylindrical mounting member 20 within the axle 15.

The aforementioned cross-sectional distortions of the tubular axle 15 and differential angular deflections in the axle adjacent each end of the mounting will be absorbed by elastic deformation of the O-rings 35 and 36. The algebraic sum of the radial and axial forces acting upon the mounting structure will always be equal and, hence, the sensor will accurately and consistently follow the axle deflection characteristic.

The radial compressive force on the O-ring 36 also assists in maintaining the cylindrical mounting member at the proper location axially of the tubular axle. The improved mounting of the cylindrical mounting member within the tubular axle requires no prior special treatment of the axle bore.

It is within the scope of the invention to also associate a clamping ring, such as the clamping ring 50, with the end of the cylindrical mounting member having the O-ring 35 and locating the groove therefor in a position whereby the structure would be the same as shown in association with the O-ring 36 so that additional compression can also be exerted on the O-ring 35.

Since the O-rings are of elastic material and will have some set with age, the radial compression provided by the annular clamping ring is designed to be sufficient to provide more than adequate compression initially to take into account the set.

The cylindrical mounting member 20 is of sufficient strength to support the O-rings 35 and 36 whereby they can act to absorb the elastic deformation of the O-rings upon the distortions which occur within the tubular axle without distortion of the cylindrical mounting member, so that the sensor will only correctly sense axle angular deflection.

I claim:

1. A mounting for an inclinometer or the like for placement thereof within a tubular axle of an aircraft undercarriage comprising, in combination, a tubular axle having an internal diameter, a cylindrical mounting member within the tubular axle and having an outer diameter less than the internal diameter of the tubular axle to provide a radial clearance therebetween, a first O-ring surrounding said cylindrical mounting member adjacent an end thereof and extending beyond the surface thereof to provide a radial compression resulting from endwise insertion of the cylindrical mounting member in the tubular axle, a rectangular annular peripheral groove adjacent the opposite end of the cylindrical mounting member, said groove being formed between an end face of the cylindrical mounting member and a detachable annular clamping ring which abuts said end face, a second O-ring positioned in said groove and having a relaxed diameter greater than the width of said groove, and means on the cylindrical mounting member for drawing said annular clamping ring against said end face to reduce the width of the groove to less than the diameter of the second O-ring to induce a radial compressive force between the tubular axle and the cylindrical mounting member.

* * * * *